(12) United States Patent
Duran

(10) Patent No.: US 8,733,533 B1
(45) Date of Patent: May 27, 2014

(54) MOBILE MATERIAL ELEVATOR ON WHEELS

(76) Inventor: Robert P. Duran, Richmond, TX (US)

(*) Notice: Subject to any disclaimer, the term of this patent is extended or adjusted under 35 U.S.C. 154(b) by 42 days.

(21) Appl. No.: 13/586,955

(22) Filed: Aug. 16, 2012

(51) Int. Cl.
*B65G 21/12* (2006.01)
*B65G 41/00* (2006.01)

(52) U.S. Cl.
CPC .............. *B65G 41/002* (2013.01); *B65G 21/12* (2013.01)
USPC ........ 198/316.1; 198/318; 198/698; 198/801; 198/861.5

(58) Field of Classification Search
USPC .............. 198/315, 316.1, 318, 592, 593, 698, 198/801, 861.5, 312; 182/103, 214, 36
See application file for complete search history.

(56) References Cited

U.S. PATENT DOCUMENTS

| | | | |
|---|---|---|---|
| 3,051,295 A * | 8/1962 | Moy | 198/313 |
| 3,825,107 A * | 7/1974 | Cary et al. | 198/313 |
| 4,004,778 A | 1/1977 | Steinhagen | |
| 4,310,098 A | 1/1982 | Dirksen | |
| 4,864,837 A | 9/1989 | Fielden, Jr. | |
| 5,224,612 A | 7/1993 | Shirley | |
| D376,885 S | 12/1996 | Carey et al. | |
| 5,669,562 A * | 9/1997 | Smith | 241/101.74 |
| 5,685,687 A * | 11/1997 | Frye | 414/505 |
| 5,911,287 A | 6/1999 | Campbell | |
| 6,065,621 A * | 5/2000 | Fatemi et al. | 212/301 |
| 6,244,381 B1 | 6/2001 | Ruble | |
| 6,591,976 B1 * | 7/2003 | Barnett | 198/801 |
| 6,966,418 B2 * | 11/2005 | Crookston | 198/312 |
| 7,971,700 B1 * | 7/2011 | Knudsen | 198/312 |
| 8,074,767 B1 * | 12/2011 | Denison | 182/42 |
| 8,136,632 B2 * | 3/2012 | Gabriel | 182/116 |

* cited by examiner

Primary Examiner — Mark A Deuble

(57) ABSTRACT

A roof loading device delivers materials such as shingles to a roof from the ground. The device includes a platform and a conveyor coupled to the platform. The conveyor has a first end pivotally coupled to the platform and a second end positionable in spaced relationship from the platform wherein the second end is configured for being positioned over a surface of a roof. A motivator is operationally coupled to the conveyor wherein the conveyor is configured for moving an object on the conveyor from the first end of the conveyor towards the second end of the conveyor.

19 Claims, 7 Drawing Sheets

MOBILE MATERIAL ELEVATOR ON WHEELS

BACKGROUND OF THE DISCLOSURE

Field of the Disclosure

The disclosure relates to loading devices and more particularly pertains to a new loading device for delivering materials such as shingles to a roof from the ground and safely removing materials from a roof.

SUMMARY OF THE DISCLOSURE

An embodiment of the disclosure meets the needs presented above by generally comprising a platform and a conveyor coupled to the platform. The conveyor has a first end pivotally coupled to the platform and a second end positionable in spaced relationship from the platform wherein the second end is configured for being positioned over a surface of a roof. A reversible motivator is operationally coupled to the conveyor wherein the conveyor is configured for moving an object on the conveyor from the first end of the conveyor towards the second end of the conveyor or from the second end of the conveyor to the first end of the conveyor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
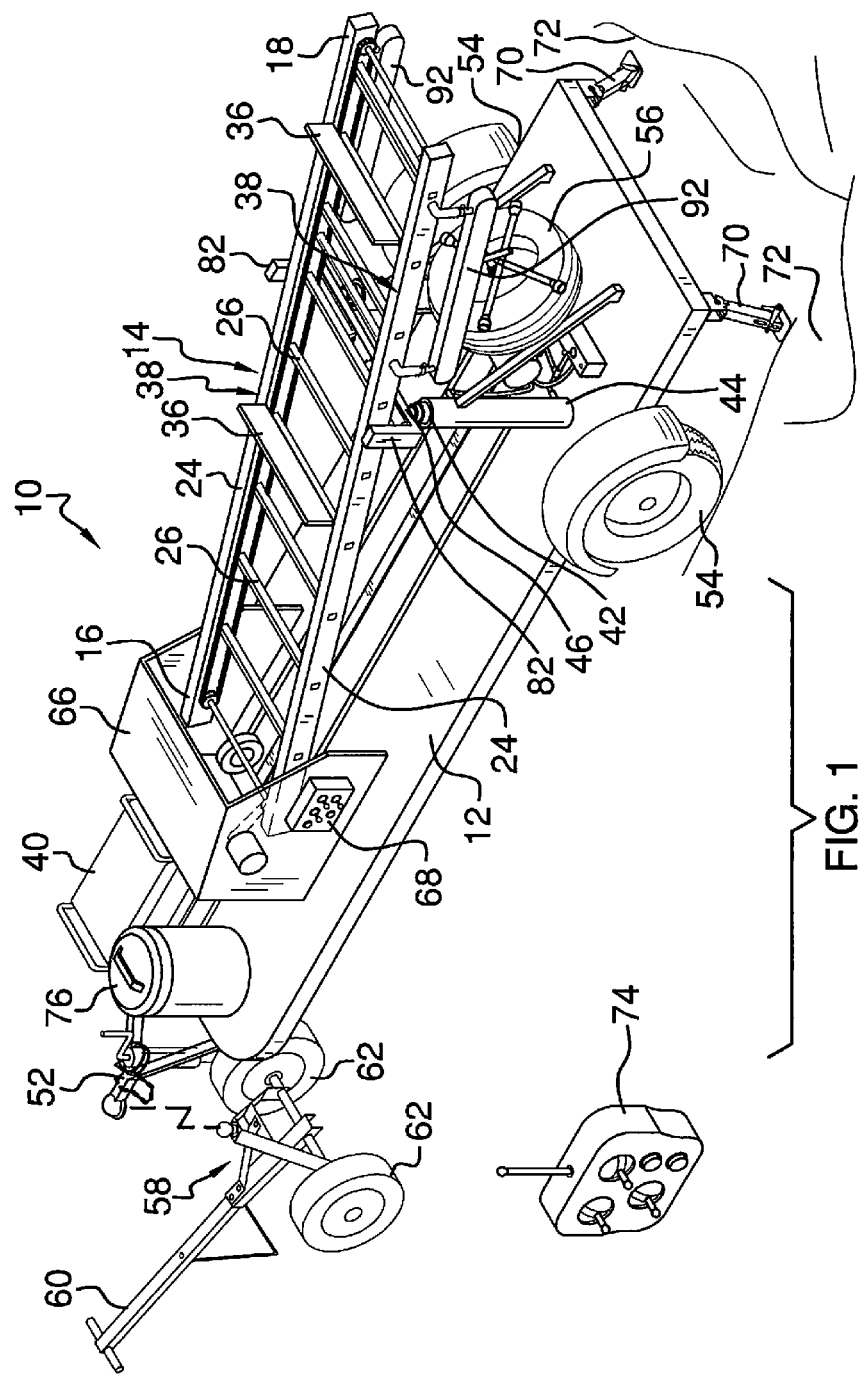
FIG. 1 is a top rear side perspective view of a roof loading device according to an embodiment of the disclosure.
Figure 2:
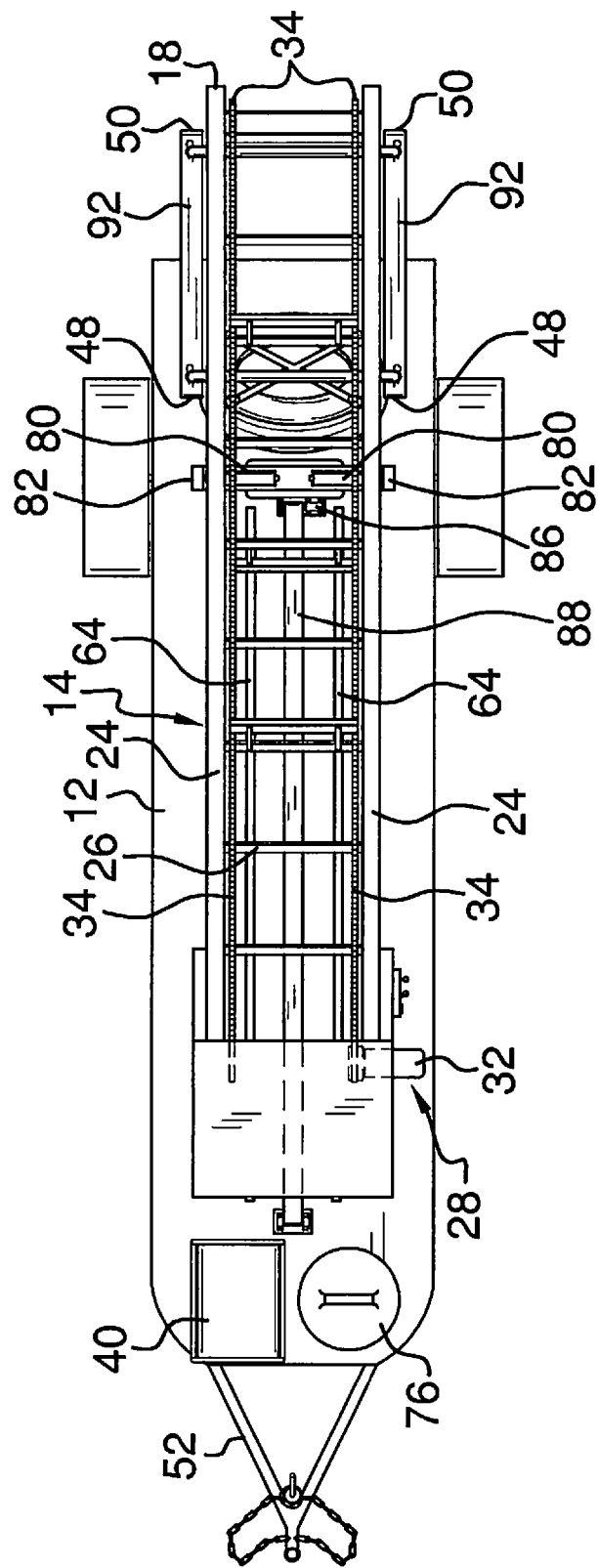
FIG. 2 is a top view of an embodiment of the disclosure.
Figure 3:
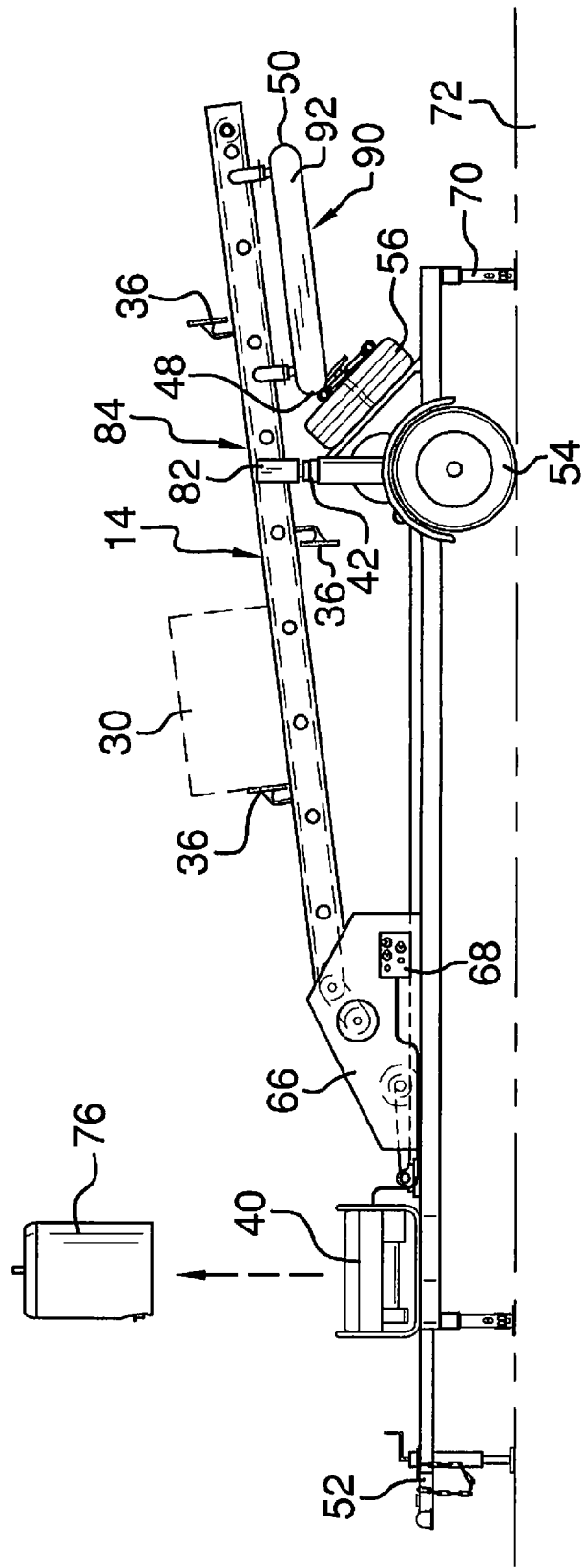
FIG. 3 is a side view of an embodiment of the disclosure.
Figure 4:
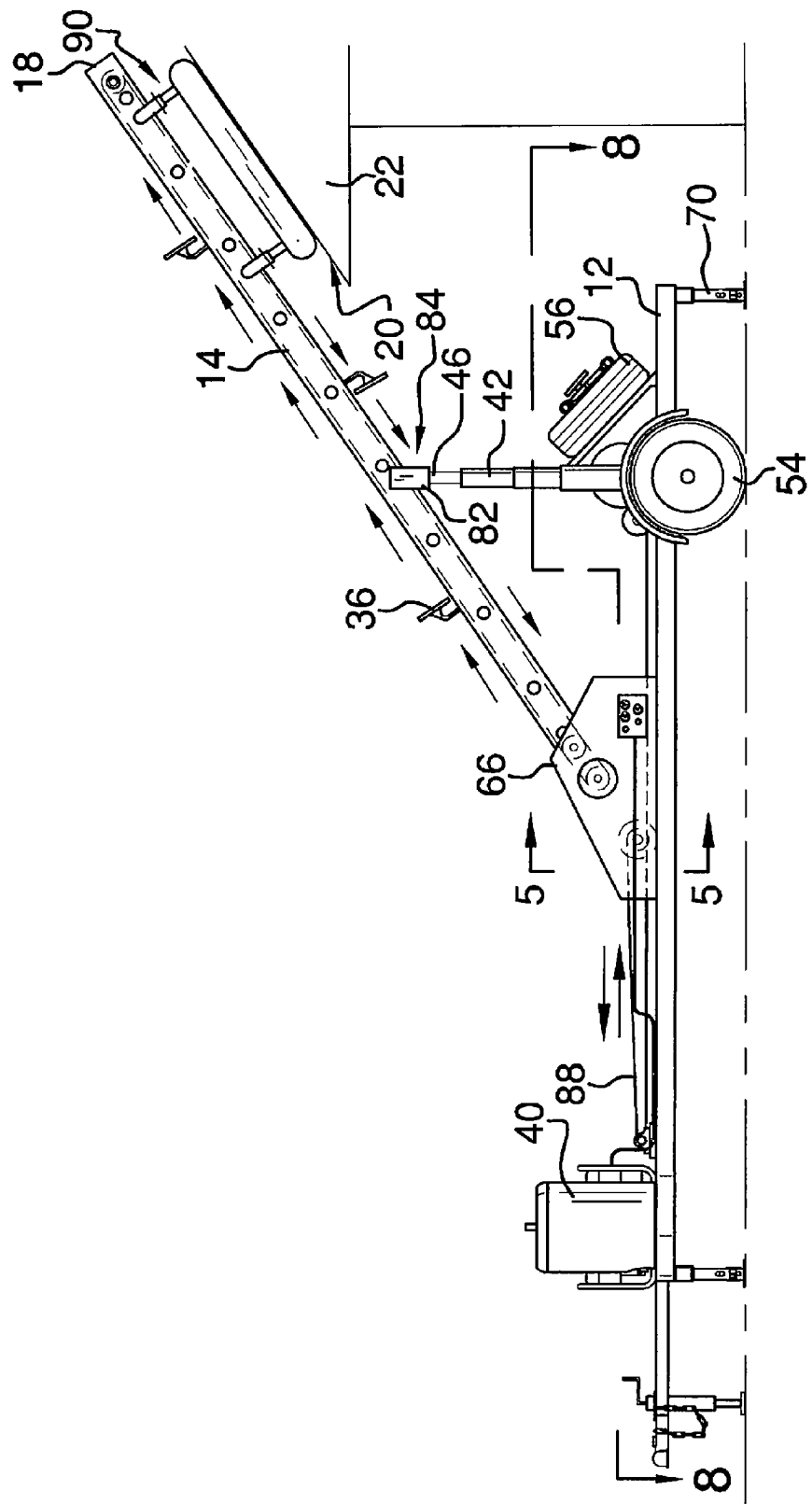
FIG. 4 is a side view of an embodiment of the disclosure.
Figure 5:
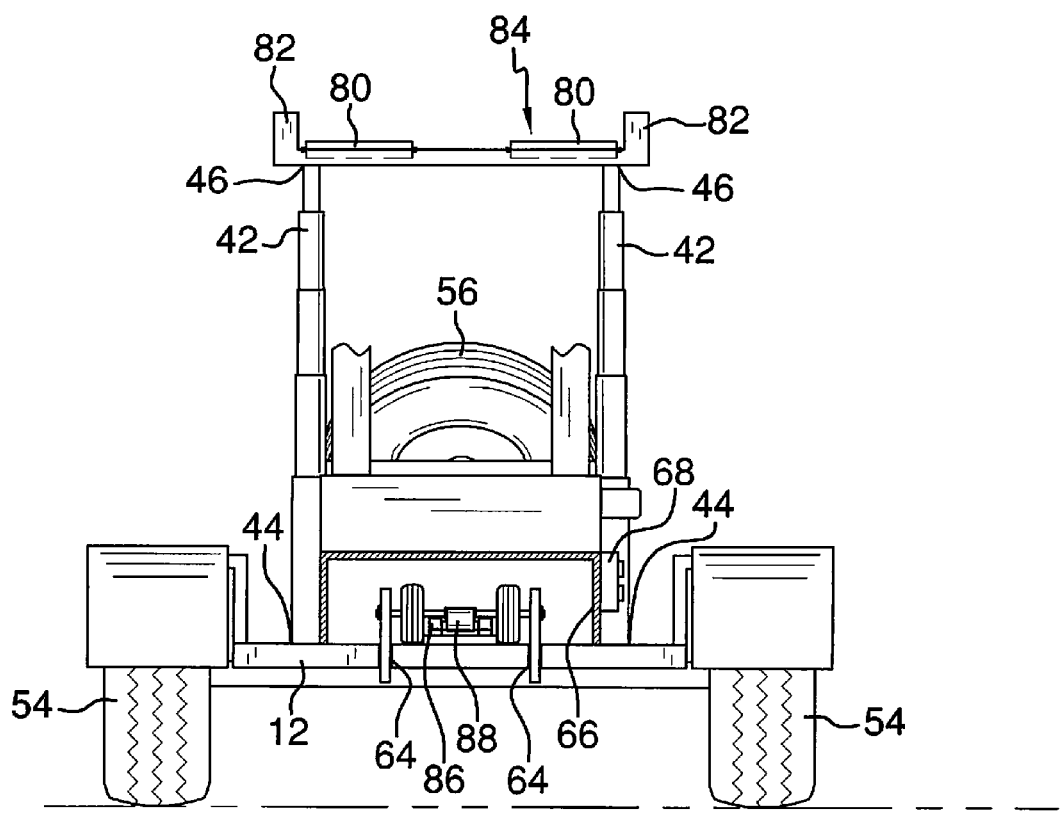
FIG. 5 is a cross-sectional view of an embodiment of the disclosure taken along line 5-5 of FIG. 4.
Figure 6:
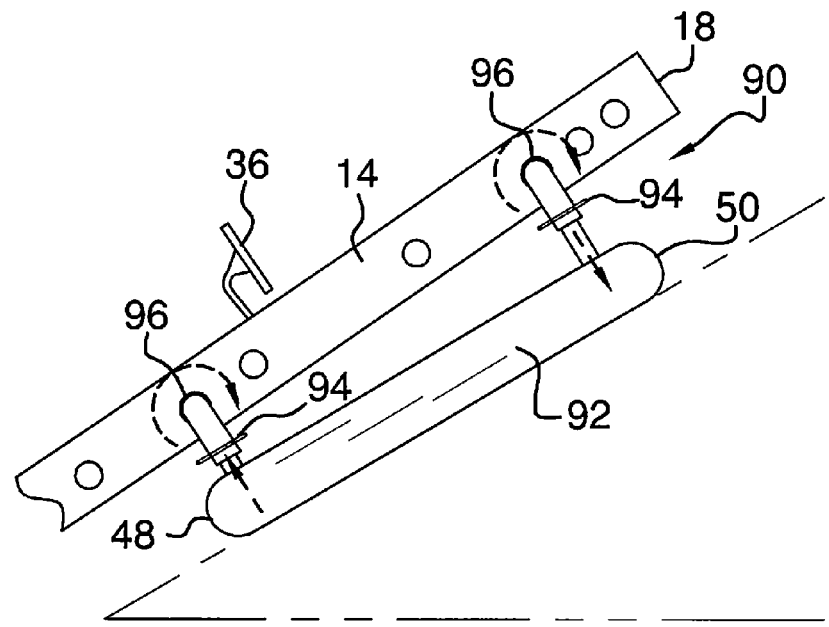
FIG. 6 is a side view of an embodiment of the disclosure.
Figure 7:
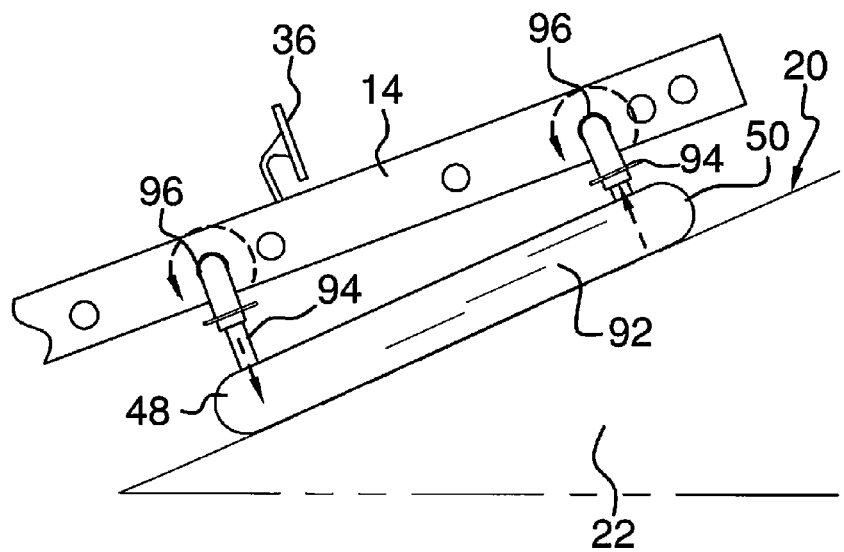
FIG. 7 is a side view of an embodiment of the disclosure.
Figure 8:
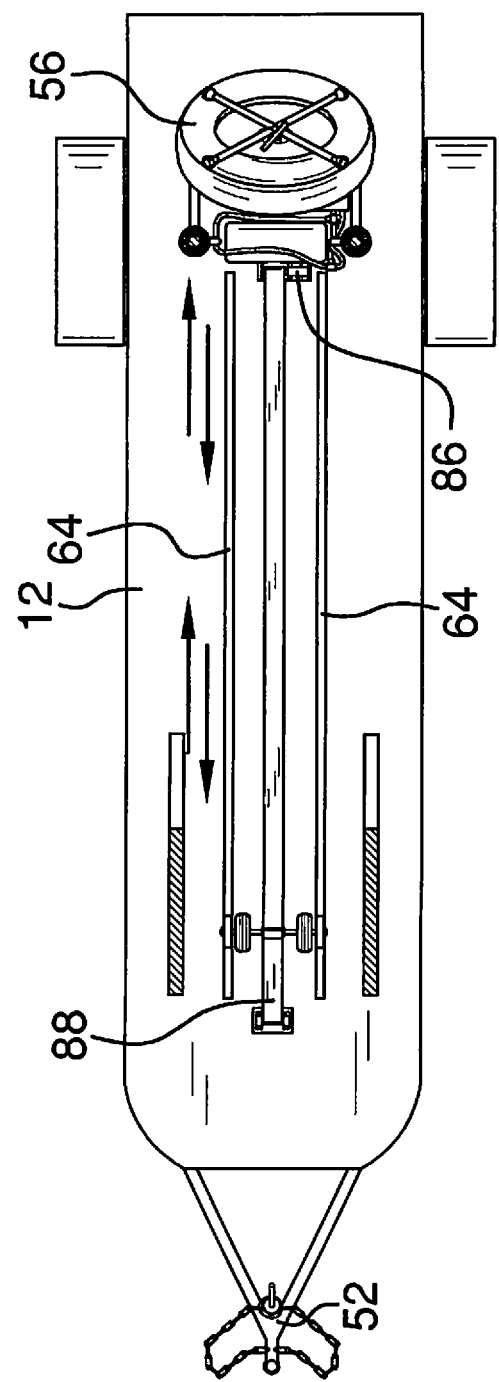
FIG. 8 is a top view of an embodiment of the disclosure with the conveyor removed.

With reference now to the drawings, and in particular to FIGS. 1 through 8 thereof, a new loading device embodying the principles and concepts of an embodiment of the disclosure and generally designated by the reference numeral 10 will be described.

As best illustrated in FIGS. 1 through 8, the roof loading device 10 generally comprises a platform 12 and a conveyor 14 coupled to the platform 12. The conveyor 14 has a first end 16 pivotally coupled to the platform 12. The conveyor 14 has a second end 18 positionable in spaced relationship from the platform 12 wherein the second end 18 is configured for being positioned over a surface 20 of a roof 22. The conveyor 14 may have a pair of spaced side rails 24 and a plurality of rungs 26 coupled to and extending between the side rails 24 allowing a person to climb the conveyor 14 to reach the roof 22.

A reversible motivator 28 is operationally coupled to the conveyor 14 wherein the conveyor 14 is configured for moving an object 30 on the conveyor 14 from the first end 16 of the conveyor 14 towards the second end 18 of the conveyor 14. The motivator 28 may be operated to reverse the direction of the conveyor 14 to safely move items from the roof 22. The motivator 28 may be a motor 32 coupled to the platform 12. The motor 32 is operationally coupled to the conveyor 14. A pair of chain loops 34 is provided with each chain loop 34 being coupled to an associated one of the side rails 24. A plurality of support plates 36 may be utilized while one support plate 36 is still functional. Each support plate 36 is coupled to and extends between the chain loops 34 wherein the support plates 36 are moved between the first end 16 and the second end 18 of the conveyor 14 by the chain loops 34. The chain loops 34 provide a complete circuit around the conveyor 14 such that the support plates are moved fully around the conveyor 14. Each support plate 36 extends away from the side rails 24 of the conveyor 14 transverse with respect to a plane extending between aligned upper surfaces 38 of the side rails 24. Thus, the support plates 36 will push the object 30 from the first end 16 of the conveyor to the second end 18 of the conveyor 14 as the object 30 rests on the upper surfaces 38 of the side rails 24. A generator 40 may be coupled to and positioned on the platform 12. The generator 40 is electrically coupled to the motor 32.

An extendable arm 42 has a first end 44 coupled to the platform 12 and a second end 46 abutting and supporting the conveyor 14. The conveyor 14 is pivoted relative to the platform 12 when the arm 42 is extended and retracted. At least one roller 80 is coupled to the arm 42. The conveyor 14 rests on the roller 80 to facilitate movement of the arm 42 and the conveyor 14 relative to each other. The arm 42 further has side sections 82 extending upwardly creating a seat 84 preventing the conveyor 14 from moving laterally off of the arm 42. The arm 42 may be moved hydraulically.

A stand assembly 90 is coupled to the conveyor 14 proximate the second end 18 of the conveyor 14. The stand assembly 90 rests on the surface 20 of the roof 22 during use to protect the roof from being damaged. The stand assembly 90 has a pair of elongated skids 92. Each skid 92 has a first end 48 and a second end 50 coupled to the conveyor 14. The skids 92 are positioned beneath the conveyor 14 wherein the skids 92 support the conveyor 14 on the surface 20 of the roof 22. Each of the first ends 48 and the second ends 50 of the skids 92 is extendably coupled to the conveyor 14 by telescopic arms 94 wherein each of the skids 92 is adjustable to a desired angle relative to the conveyor 14. Each of the telescopic arms 94 has a top end 96 pivotally coupled to the conveyor 14. Thus, as shown particularly in FIGS. 6 and 7, the skids 92 are configured to be positioned at an angle complementary to an angle of the surface 20 of the roof 22.

A trailer hitch 52 may be coupled to and extend from the platform 12. At least a pair of platform wheels 54 is coupled to the platform 12 wherein the platform 12 is configured for coupling to a vehicle for transport. A spare platform wheel 56 may be coupled to the platform 12. The spare platform wheel 56 is selectively interchangeable with the platform wheels 54 in the event one of the platform wheels 54 needs replacement. A dolly 58 may also be provided having a handle 60 and at least one dolly wheel 62 coupled to the handle 60. The dolly 58 is selectively couplable to the platform 12 by attachment to the trailer hitch 52 wherein the platform 12 is positionable by manipulating the dolly 58.

A track 64 is coupled to the platform and extends longitudinally along the platform 12. A housing 66 may be coupled to the platform 12 and operationally positioned on the track 64. The first end 16 of the conveyor 14 is coupled to the housing 66 and extends out of the housing 66. The housing 66 is slidably coupled to the track 64 wherein the housing 66 is selectively positionable along a length of the track 64 at a desired position. A control panel 68 may be coupled to the housing 66. The control panel 68 is operationally coupled to the conveyor 14, the housing 66, and the arm 42 to adjust the conveyor 14 into a desired position. A remote control 74 may also be operationally coupled to the conveyor 14, the arm 42 and the housing 66 for selectively positioning the conveyor 14 in a desired position. A second motor 86 and strap 88 may be coupled to the platform 12 and used to position the housing 66 as desired.

A pair of stabilizers 70 may also be coupled to the platform 12. Each stabilizer 70 is selectively extendable from the platform 12 to abut a support surface 72 providing a broad base and hold the platform 12 steady during use. A water cooler 76 may also be removably coupled to and positioned on the platform 12 for the convenience of workers using the device 10.

In use, the platform 12 is positioned on the support surface 72 proximate the roof 22. The skids 92 may be adjusted to the desired angle relative to the roof 22. The conveyor 14 is adjusted using the housing 66 and the arm 42 to position the second end 18 of the conveyor over the roof 22. The conveyor 14 may then be positioned such that the stand assembly 90 rests on the surface 20 of the roof 22. The stabilizers 70 may be deployed and the platform wheels 54 chocked to prevent movement of the platform 12 while delivering materials to the roof 22 using the conveyor 14. The conveyor 14 may be used as a ladder for persons to climb onto the roof 22 and the chain loops 34 selectively engaged to urge the support plates 36 to deliver materials to the roof 22. When work is complete, the conveyor 14 may be used in reverse to move items down from the roof 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A roof loading device comprising:
    a platform;
    a conveyor coupled to said platform, said conveyor having a first end pivotally coupled to said platform, said conveyor having a second end positionable in spaced relationship from said platform wherein said second end is configured for being positioned over a surface of a roof;
    a motivator operationally coupled to said conveyor wherein said conveyor is configured for moving an object on said conveyor from said first end of said conveyor towards said second end of said conveyor;
    a stand assembly coupled to said conveyor proximate said second end of said conveyor, said stand assembly having a pair of elongated skids, each said skid having a first end a second end coupled to said conveyor, said skids being positioned beneath said conveyor wherein said skids support said conveyor on the roof, each of said first ends and said second ends of said skids being extendably coupled to said conveyor wherein each of said skids is adjustable to a desired angle relative to said conveyor wherein said skids are configured to be positioned at an angle complementary to an angle of the roof.

2. The device of claim 1, further comprising an extendable arm having a first end coupled to said platform, said arm having a second end abutting and supporting said conveyor, said conveyor being pivoted relative to said platform when said arm is extended and retracted.

3. The device of claim 1, further comprising:
    a trailer hitch coupled to and extending from said platform; and
    a pair of platform wheels coupled to said platform wherein said platform is configured for coupling to a vehicle.

4. The device of claim 3, further comprising a dolly, said dolly having a handle and at least one dolly wheel coupled to said handle, said dolly being selectively couplable to said trailer hitch wherein said platform is positionable by manipulating said dolly.

5. The device of claim 1, further comprising said motivator being a motor coupled to said platform, said motor being operationally coupled to said conveyor.

6. The device of claim 5, further comprising a generator electrically coupled to said motor, said generator being positioned on said platform.

7. The device of claim 1, further comprising:
    said conveyor having a pair of spaced side rails and a plurality of rungs coupled to and extending between said side rails;
    a pair of chain loops, each chain loop being coupled to an associated one of said side rails; and
    a plurality of support plates, each support plate being coupled to and extending between said chain loops wherein said support plates are moved between said first end and said second end of said conveyor by said chain loops.

8. The device of claim 7, further comprising each said support plate extending away from said side rails of said conveyor transverse with respect to a plane extending between aligned upper surfaces of said side rails.

9. The device of claim 1, further comprising a water cooler coupled to and positioned on said platform.

10. The device of claim 1, further comprising a housing coupled to said platform, said first end of said conveyor being coupled to said housing, said conveyor extending out of said housing.

11. The device of claim 10, further comprising:
    a track coupled to said platform;
    said housing being slidably coupled to said track wherein said housing is selectively positionable along a length of said track.

12. The device of claim 10, further comprising:
    an extendable arm having a first end coupled to said platform, said arm having a second end abutting and supporting said conveyor, said conveyor being pivoted relative to said platform when said arm is extended and retracted; and a control panel coupled to said housing, said control panel being operationally coupled to said conveyor and said arm.

13. The device of claim 3, further comprising a spare platform wheel coupled to said platform.

14. The device of claim 1, further comprising stabilizers coupled to said platform, each said stabilizer being selectively extendable from said platform, said stabilizers being configured for abutting a support surface.

15. The device of claim 11, further comprising an extendable arm having a first end coupled to said platform, said arm having a second end abutting and supporting said conveyor, said conveyor being pivoted relative to said platform when said arm is extended and retracted; and a remote control operationally coupled to said conveyor, said arm and said housing for selectively positioning said conveyor in a desired position.

16. A roof loading device comprising:

a platform;

a conveyor coupled to said platform, said conveyor having a first end pivotally coupled to said platform, said conveyor having a second end positionable in spaced relationship from said platform wherein said second end is configured for being positioned over a surface of a roof, said conveyor having a pair of spaced side rails and a plurality of rungs coupled to and extending between said side rails;

a motivator operationally coupled to said conveyor wherein said conveyor is configured for moving an object on said conveyor from said first end of said conveyor towards said second end of said conveyor, said motivator being a motor coupled to said platform, said motor being operationally coupled to said conveyor;

a generator electrically coupled to said motor, said generator being positioned on said platform;

an extendable arm having a first end coupled to said platform, said arm having a second end abutting and supporting said conveyor, said conveyor being pivoted relative to said platform when said arm is extended and retracted;

a stand assembly coupled to said conveyor proximate said second end of said conveyor, said stand assembly having a pair of elongated skids, each said skid having a first end a second end coupled to said conveyor, said skids being positioned beneath said conveyor wherein said skids support said conveyor on the roof, each of said first ends and said second ends of said skids being extendably coupled to said conveyor wherein each of said skids is adjustable to a desired angle relative to said conveyor wherein said skids are configured to be positioned at an angle complementary to an angle of the roof;

a trailer hitch coupled to and extending from said platform;

a pair of platform wheels coupled to said platform wherein said platform is configured for coupling to a vehicle;

a spare platform wheel coupled to said platform, said spare platform wheel being selectively interchangeable with said platform wheels;

a dolly, said dolly having a handle and at least one dolly wheel coupled to said handle, said dolly being selectively couplable to said trailer hitch wherein said platform is positionable by manipulating said dolly;

a pair of chain loops, each chain loop being coupled to an associated one of said side rails;

a plurality of support plates, each support plate being coupled to and extending between said chain loops wherein said support plates are moved between said first end and said second end of said conveyor by said chain loops, each said support plate extending away from said side rails of said conveyor transverse with respect to a plane extending between aligned upper surfaces of said side rails;

a track coupled to said platform;

a housing coupled to said platform, said first end of said conveyor being coupled to said housing, said conveyor extending out of said housing, said housing being slidably coupled to said track wherein said housing is selectively positionable along a length of said track;

a control panel coupled to said housing, said control panel being operationally coupled to said conveyor and said arm;

a pair of stabilizers coupled to said platform, each said stabilizer being selectively extendable from said platform, said stabilizers being configured for abutting a support surface;

a remote control operationally coupled to said conveyor, said arm and said housing for selectively positioning said conveyor in a desired position; and a water cooler removably coupled to and positioned on said platform.

17. A roof loading device comprising:

a platform;

a conveyor coupled to said platform, said conveyor having a first end pivotally coupled to said platform, said conveyor having a second end positionable in spaced relationship from said platform wherein said second end is configured for being positioned over a surface of a roof;

a motivator operationally coupled to said conveyor wherein said conveyor is configured for moving an object on said conveyor from said first end of said conveyor towards said second end of said conveyor;

a housing coupled to said platform, said first end of said conveyor being coupled to said housing, said conveyor extending out of said housing;

a track coupled to said platform;

said housing being slidably coupled to said track wherein said housing is selectively positionable along a length of said track.

18. The device of claim 17, further comprising:

an extendable arm having a first end coupled to said platform, said arm having a second end abutting and supporting said conveyor, said conveyor being pivoted relative to said platform when said arm is extended and retracted; and a control panel coupled to said housing, said control panel being operationally coupled to said conveyor and said arm.

19. The device of claim 17, further comprising an extendable arm having a first end coupled to said platform, said arm having a second end abutting and supporting said conveyor, said conveyor being pivoted relative to said platform when said arm is extended and retracted; and a remote control operationally coupled to said conveyor, said arm and said housing for selectively positioning said conveyor in a desired position.

\* \* \* \* \*